July 14, 1931.  N. L. MOCHEL  1,814,762
VALVE STRUCTURE
Filed July 31, 1929
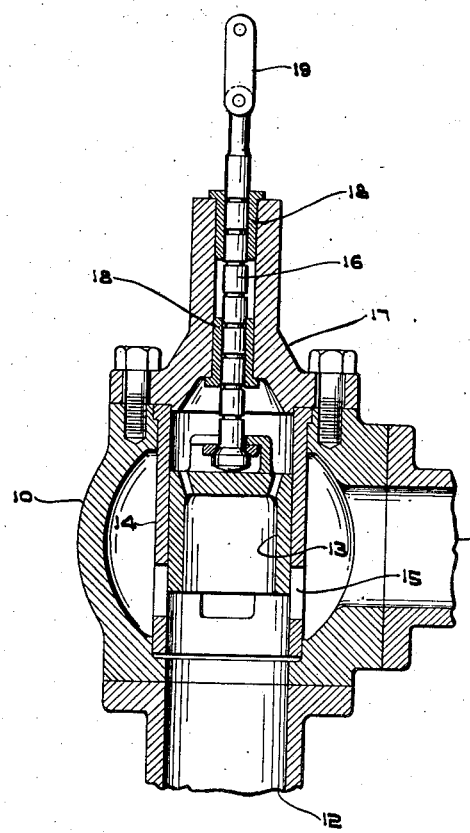
WITNESS
INVENTOR
N.L.Mochel.
BY
ATTORNEY Patented July 14, 1931

1,814,762

UNITED STATES PATENT OFFICE

NORMAN L. MOCHEL, OF RIDLEY PARK, PENNSYLVANIA, ASSIGNOR TO WESTINGHOUSE ELECTRIC & MANUFACTURING COMPANY, A CORPORATION OF PENNSYLVANIA

VALVE STRUCTURE

Application filed July 31, 1929. Serial No. 382,394.

My invention relates to valves or valve structures and particularly to valves of the character provided with a stem portion for guiding back and forth or opening and closing movements of the valve member. It has for an object to provide apparatus of the character designated which shall be capable of operating reliably and effectively in regions of relatively high temperature and in regions where lubrication of the valve cannot be readily effected.

It has for a further object to provide a valve of the foregoing character which shall include a valve stem and a guide for the valve stem, which valve stem guide shall be so constructed and arranged as to provide an intervening bearing surface of such a character as will operate satisfactorily for long periods of time under unusually severe conditions without seizure or galling between the valve stem and the guide.

These and other objects are effected by my invention, as will be apparent from the following description and claims taken in connection with the accompanying drawing, forming a part of this application, in which the single figure is a view, in sectional elevation, of one form of valve structure arranged in accordance with my invention.

In the past, considerable difficulty has been encountered in producing a valve capable of operating satisfactorily in regions of relatively high temperatures and without lubrication. An example of such an operating condition is the steam chest of a turbine utilizing high pressure, high temperature motive steam, wherein the valve must operate within the steam chest to regulate the admission of the high pressure, high temperature steam to the turbine. Other examples are the valves of internal combustion engines which regulate the incoming or exhaust gases of the engine cylinders and wherein the valves must operate satisfactorily in the region of the combustion temperatures obtaining in the engine cylinders.

As heretofore constructed, valves operating under the foregoing conditions sometimes functioned improperly owing to galling or seizure of the valve stem in the valve guide or valve bonnet bushing as induced by the prevailing high temperatures and the metallic contacts existing between the valve stem and the guide.

I have, therefore, conceived of a form of valve structure which avoids the foregoing difficulties. In accordance with my invention, I provide a valve stem which preferably is composed of some corrosion-resisting metal such as, for example, copper-nickel alloys, chrome-iron alloys, chrome-nickel-iron alloys or some related alloys. Specific examples of very desirable metals which may be used are either stainless steel or Monel metal. The valve guide or valve bushing which coacts with the valve stem is preferably composed of a steel which may be hardened by nitriding, that is, by the absorption of nitrogen. In this way, any or all of the surfaces of the guide or bushing may be readily hardened. Various kinds of alloys steels may be employed. However, steels containing aluminum, chromium, manganese, silicon or molybdenum, either separately or in any desired combination may be considered to be nitridable. Preferably, I employ a steel known in the trade as Nitralloy and embody the following constitutions:

| | Per cent |
|---|---|
| C | 0.20 –1.30 |
| Mn | 0.40 –0.60 |
| P | 0.025–Max. |
| S | 0.025–Max. |
| Si | 0.50 –Max. |
| Ni | 0.20 –Max. |
| Cr | 0.75 –1.50 |
| Mo | 0.15 –0.25 |
| Al | 0.50 –1.25 |

Such a steel may be hardened for use in valve structures by placing the valve guide or bushing in a retort, raising the temperature of the retort sufficiently, for example, between 900° and 1050° F., and disposing some substance capable of giving off nitrogen such as, for example, ammonia gas, into the retort for a sufficient length of time to obtain the depth of surface hardness required. In this way, a valve guide or bushing is easily and readily produced having extraordinary wearing qualities.

Hardening the valve guide or bushing by the nitriding process provides advantages which cannot be obtained either by ordinary methods of hardening or by case hardening. The latter methods merely produce a hardened surface of high carbon steel while the nitriding process produces a surface of iron-nitride. As a result, the surface produced by the nitriding process has qualities such as, resistance to corrosion and minimizing of frictional resistance, not possessed by hardened surfaces produced by other known methods. Of still more importance, however, is the fact that the degree of hardness obtained by nitriding remains stable and is not affected when employed in regions of relatively high temperature as, for example, 750° F., whereas the surfaces produced by other methods of hardening are not stable under these temperature conditions, the material having a tendency to temper or soften with the result that the valve stem may eventually stick in its guide and interrupt the successful operation of the valve.

Referring now to the drawing, I show a turbine steam chest 10 having an inlet connection 11 and an outlet connection 12. The flow of steam through the steam chest and to the turbine is controlled by a valve 13 which reciprocates in a sleeve 14, the latter having its end portions secured in a fluid tight manner in the valve chest. The sleeve 14 is provided with a plurality of openings or ports 15 arranged to be covered and uncovered by the reciprocating movements of the valve 13 in a manner well understood in the art.

The valve 13 is provided with a valve stem 16 extending outwardly through a bonnet 17 provided on the steam chest. Fixedly secured in the bonnet 17 are bushings 18 arranged to center or guide the opening and closing movements of the valve stem 16, the valve stem 16 being freely slidable, axially, in the guide bushings 18. Secured to the end of the valve stem is a link 19 adapted to be connected to the turbine governor (not shown) in a manner well understood in the art, the turbine governor being effective to move the valve stem to open or close the valve.

In accordance with my invention, the valve stem 16 is made of some metal having excellent corrosion-resisting properties such as, for example, stainless steel or Monel metal, while the guide bushing is composed of a steel such as, for example, Nitralloy. The external surfaces of the bushing, and particularly the bore of the bushing, are extremely hard, they having been subjected to the nitriding process heretofore described. As a result, the surface of the bore of the bushing, which surface is of such a character as to resist corrosion, minimize friction and retain its hardness under the operating conditions, coacts with the corrosion-resisting metal of the valve stem to provide an extraordinarily effective bearing surface. I have found that, by constructing the valve stem and the valve guide bushing of this combination of materials and in this manner, the valve stem will continue to move freely within the bushing for an indefinite period of time even though it is compelled to operate under conditions of relatively high temperature such as, for example, 750° F. and even though no lubricant can be supplied to the bearing surface. As a result the operation of the valve structure as a whole is rendered highly satisfactory.

From the foregoing, it will be apparent that I have devised a form of valve structure capable of operating satisfactorily under extraordinary operating conditions and while, in the embodiment shown in the drawing, I have illustrated a valve of the sleeve type, nevertheless it will be obvious that my invention contemplates, in its broader aspects, the provision of suitable guide means between the moving and stationary portions of valve structures in general, the guide means and the valve stem to be so constructed and arranged as to form a bearing surface therebetween of such a character as will insure freedom of movement of the valve stem in the guide. Furthermore, while in the present embodiment, I show a valve structure wherein the valve guide bushing is nitrided and the valve stem is formed of a metal which is resistant to corrosion, nevertheless, it will be obvious that it is within the purview of my invention to obtain substantially the same effect or results by nitriding the valve stem and forming the valve guide of the corrosion-resisting metal, the genus of my invention being the provision of a valve guide bearing composed of two coacting surfaces formed in the relative manners heretofore described.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In a valve structure for controlling the flow of relatively high temperature fluids, the combination of a movable valve having a valve stem provided with a bearing surface and a stationary guide having a bearing surface coacting with the bearing surface of the valve stem, one of said bearing surfaces being hardened by nitriding and the other of said bearing surfaces being composed of a corrosion-resisting metal.

2. In a valve structure for controlling the flow of relatively high temperature fluids, the combination of an axially movable valve having a valve stem provided with a bearing surface and a stationary guide having a bearing surface coacting with the bearing surface of the valve stem, the bearing surface of the guide being hardened by nitriding and the bearing surface of the valve stem being composed of a metal having corrosion-resisting properties.

In testimony whereof, I have hereunto subscribed my name this 29th day of July, 1929.

NORMAN L. MOCHEL.